United States Patent
Jeong et al.

(10) Patent No.: US 8,260,919 B2
(45) Date of Patent: Sep. 4, 2012

(54) METHOD OF CONTROLLING DOWNLOAD LOAD OF SECURE MICRO CLIENT IN DOWNLOADABLE CONDITIONAL ACCESS SYSTEM

(75) Inventors: Young Ho Jeong, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 258 days.

(21) Appl. No.: 12/546,851

(22) Filed: Aug. 25, 2009

(65) Prior Publication Data
US 2010/0146116 A1    Jun. 10, 2010

(30) Foreign Application Priority Data
Dec. 10, 2008    (KR) .................. 10-2008-0125151

(51) Int. Cl.
*G06F 15/173* (2006.01)

(52) U.S. Cl. ........................ 709/225; 709/229

(58) Field of Classification Search .......... 709/223, 709/225, 229
See application file for complete search history.

(56) References Cited

U.S. PATENT DOCUMENTS

| | | | |
|---|---|---|---|
| 6,246,767 B1 | 6/2001 | Akins, III et al. | |
| 6,745,245 B1 | 6/2004 | Carpenter | |
| 7,219,140 B2 * | 5/2007 | Marl et al. | 709/219 |
| 7,516,386 B2 * | 4/2009 | Herley et al. | 714/746 |
| 2004/0117442 A1 * | 6/2004 | Thielen | 709/203 |
| 2007/0157310 A1 * | 7/2007 | Kondo et al. | 726/22 |
| 2009/0100149 A1 * | 4/2009 | Arnold et al. | 709/219 |
| 2010/0304872 A1 * | 12/2010 | Gatto et al. | 463/43 |

FOREIGN PATENT DOCUMENTS
KR    1020060041563 A    5/2006
* cited by examiner

*Primary Examiner* — Emmanuel L Moise
*Assistant Examiner* — Marie Georges Henry
(74) *Attorney, Agent, or Firm* — Ladas & Parry LLP

(57) ABSTRACT

A method of controlling a download load of a Secure Micro (SM) client in a Downloadable Conditional Access System (DCAS) is provided. The method of controlling a download load of an SM client including: analyzing version information of SMs and version information of SM clients to control the download load generated in the DCAS, the version information of the SMs and the version information of the SM clients being provided from an Authentication Proxy (AP) server, and the SM clients being installed in the SMs; determining a download policy associated with a download time of a target SM client for the SMs based on a result of the analysis; and providing the AP server with the determined download policy.

19 Claims, 9 Drawing Sheets

FIG. 4

| AP_ID | SM_ID | HW_VER | SW_VER | CLIENT_IMAGE_VER | AUTH_STATUS |
|---|---|---|---|---|---|
| - - - | - - - | - - - | - - - | - - - - | - - - - |
| - - - | - - - | - - - | - - - | - - - - | - - - - |
| - - - | - - - | - - - | - - - | - - - - | - - - - |

METHOD OF CONTROLLING DOWNLOAD LOAD OF SECURE MICRO CLIENT IN DOWNLOADABLE CONDITIONAL ACCESS SYSTEM

CROSS-REFERENCE TO RELATED APPLICATION

This application claims priority from Korean Patent Application No. 10-2008-0125151, filed on Dec. 10, 2008, in the Korean Intellectual Property Office, the entire disclosure of which is incorporated herein by reference.

BACKGROUND OF THE INVENTION

1. Field of the Invention

The present invention relates to a Downloadable Conditional Access System (DCAS), and more particularly, to a technology to efficiently control a download load generated when downloading secure micro clients in a DCAS.

2. Description of Related Art

When users desire to watch a specific program, a Conditional Access System (CAS) in cable networks determines whether to provide a service based on a user authentication and enables only an approved user to receive the program.

In a CAS in an initial stage, each manufacturing company uses standards different from each other, and thus a CAS is not compatible with other devices excluding a device of a particular company. Accordingly, a broadcasting service provider is required to directly provide a receiving terminal to a subscriber, which imposes a heavy burden on a broadcasting service provider and causes a difficulty in updating a CAS.

OpenCable has provided a standard separating a Conditional Access module from a subscriber terminal to overcome such a disadvantage, that is, to prevent a monopoly of manufacturing company, boost competition, and cause a decline in a product price. Accordingly, a CAS separated from a subscriber terminal is standardized as a cable card of a Personal Computer Memory Card International Association (PCMCIA) card type. Also, a broadcasting service provider provides a subscriber with only a cable card without lending a terminal to a subscriber, and thereby may provide a fee-based broadcasting service. However, an expected result of OpenCable has not been achieved due to an increase in a cable card price and management cost as well as failure in a retail market of terminals.

In such a circumstance, a technology related to a downloadable CAS (DCAS) is provided. The DCAS downloads a conditional access software to a subscriber terminal without a separate hardware conditional access module, and thereby enables a fee-based broadcasting service to be provided.

In a DCAS, a DCAS host is required to download and install a secure micro (SM) client in an SM. In this instance, when the DCAS host downloads the SM client, a significant download load may be generated in a DCAS network. In particular, when a number of DCAS hosts simultaneously download SM clients, a technology that may control the significant download load generated in a DCAS network is required.

SUMMARY OF THE INVENTION

The present invention provides a Downloadable Conditional Access System (DCAS) which may analyze version information of Secure Micros (SMs) and version information of SM clients, determine a download policy to enable a download load to be controlled, and thereby may improve a security of a DCAS network.

The present invention also provides a DCAS which may determine a download policy associated with a download time based on at least one of a number of SMs operated by an Authentication Proxy (AP) server, a number of SMs connected to the AP server, and a number of SMs requiring download of a target SM client, and thereby may control a download load.

The present invention also provides a DCAS which may control a download load using a Security Announce (SA) message, and thereby may efficiently control a download load.

According to an aspect of the present invention, there is provided a download policy determination method in a Downloadable Conditional Access System (DCAS), the download policy determination method including: analyzing version information of SMs and version information of SM clients, the version information of the SMs and the version information of the SM clients being provided from an authentication proxy (AP) server, and the SM clients being installed in the SMs; determining a download policy associated with a download time of a target SM client for the SMs based on a result of the analysis; and providing the AP server with information associated with the determined download policy.

In an aspect of the present invention, the determining may determine the download policy associated with the download time of the target SM client to control a download load generated in the DCAS based on the result of the analysis.

According to an aspect of the present invention, there is provided a download policy operating method in a DCAS, the download policy operating method including: providing a DCAS provisioning server (DPS) with version information of SMs and version information of SM clients, the SM clients being installed in the SMs; receiving information about a download policy, associated with a download time of a target SM client for the SMs, from the DPS; and transmitting a Security Announce (SA) message to the SMs based on the received information about the download policy.

According to an aspect of the present invention, there is provided a DPS in a DCAS, the DPS including: an information receiving unit to receive version information of SMs and version information of SM clients from an AP server, the SM clients being installed in the SMs; an analysis unit to analyze the version information of the SMs and the version information of the SM clients; a download policy determination unit to determine a download policy, associated with a download time of a target SM client for the SMs, based on a result of the analysis; and a providing unit to provide the determined download policy to the AP server.

According to an embodiment of the present invention, a DCAS may analyze version information of SMs and version information of SM clients, determine a download policy to enable a download load to be controlled, and thereby may improve a security of a DCAS network.

Also, according to an embodiment of the present invention, a DCAS may determine a download policy associated with a download time based on at least one of a number of SMs operated by an AP server, a number of SMs connected to the AP server, and a number of SMs requiring download of a target SM client, and thereby may control a download load.

Also, according to an embodiment of the present invention, a DCAS may control a download load using a security announce message, and thereby may efficiently control a download load.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 4 is a diagram illustrating various factors used to control a download load according to an embodiment of the present invention;

DETAILED DESCRIPTION OF EXEMPLARY EMBODIMENTS

Figure 1:
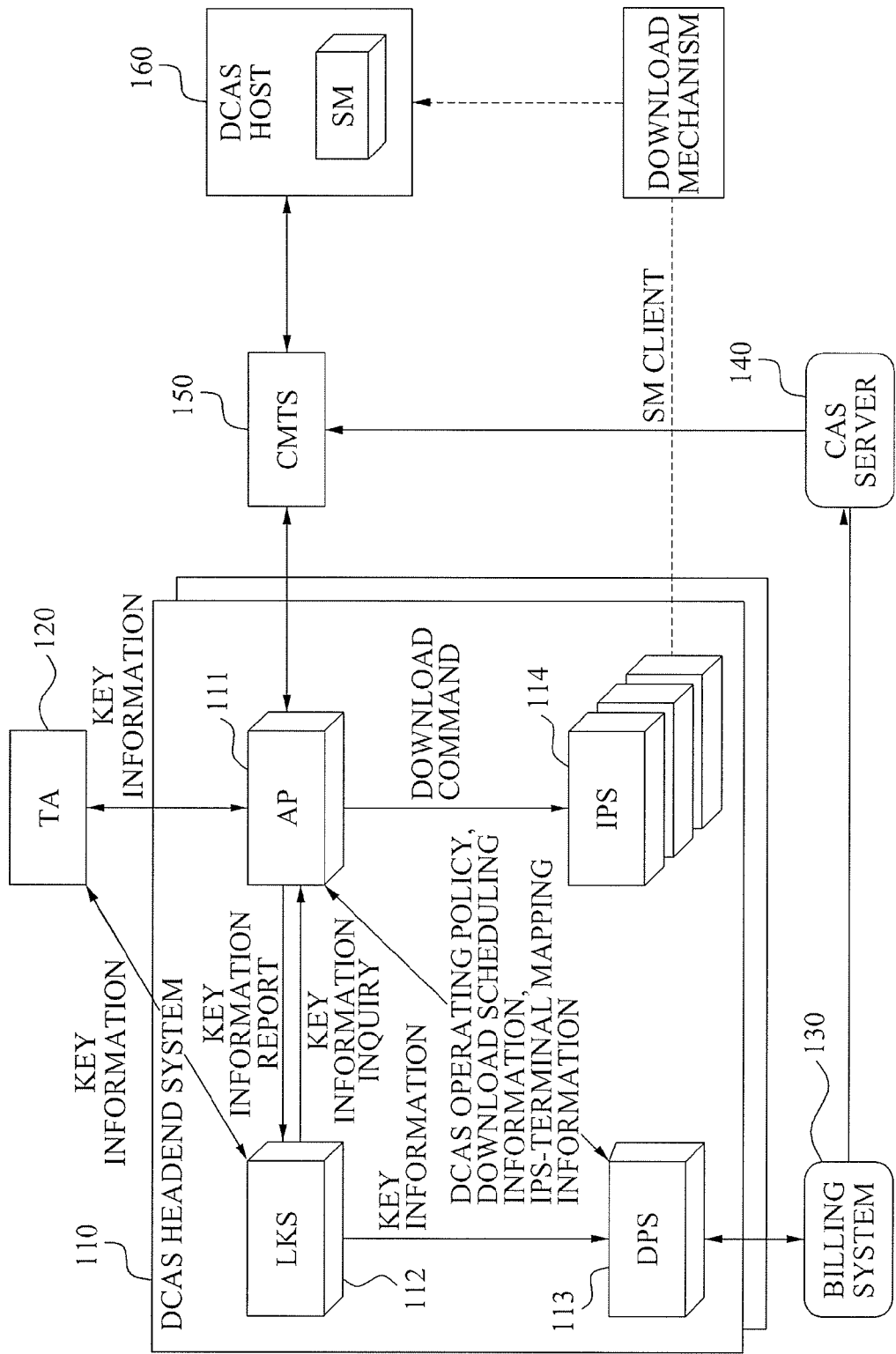
FIG. 1 is a block diagram illustrating a Downloadable Conditional Access System (DCAS) according to an embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a Downloadable Conditional Access System (DCAS) according to an embodiment of the present invention.

Referring to FIG. 1, a headend system 110 for a conditional access service may include an Authentication Proxy (AP) server 111, a Local Key Server (LKS) 112, a Downloadable Conditional Access System Provisioning Server (DPS) 113, and an Integrated Personalization System (IPS) server 114.

The headend system 110 may be installed separately from an existing Conditional Access System (CAS) server 140. Also, the headend system 110 may be operated independently from the CAS server 140, and thereby may be compatible with an existing cable broadcasting system.

The LKS 112 may store and manage information about keys of servers, such as a key of a secure micro (SM), a history of identification (ID) information of the SM, a key of the AP server 111, a history of ID information of the AP server 111, and a history of key information of the IPS server 114.

Also, the DPS 113 may determine a download policy and a policy associated with a DCAS service, and manage information associated with the policies, hereinafter, referred to as 'download-related information' or 'download policy-related information'.

Also, the IPS server 114 may store and manage an SM client to be downloaded to a DCAS host 160.

When a DCAS host 160 connected to a cable network exists, the AP server 111 may transmit information associated with an SM of the DCAS host 160 to a Trusted Authority (TA) 120 to authenticate the DCAS host 160. The TA 120 may be a reliable external authentication device. The TA 120 may authenticate the DCAS host 160 using the received information associated with the SM.

The AP server 111 may receive the download-related information or the download policy-related information from the DPS 113. The download-related information or the download policy-related information may include information associated with a connection (mapping) between the IPS server 114 and DCAS host 160, information associated with a download scheme of the SM, information associated with a DCAS operating policy, and download scheduling information.

In this instance, the AP server 111 may command the IPS server 114 to perform a process to download the SM client based on the download-related information or the download policy-related information. The IPS server 114 may perform the process to download the SM client according to a download scheme corresponding to download-related information or download policy-related information selected by the DPS 113 from a plurality of download schemes. The plurality of download schemes may correspond to a variety of transfer protocols such as a Carousel, Trivial File Transfer Protocol (TFTP), Hyper-Text Transfer Protocol (HTTP), and the like.

When an authentication of the DCAS host 160 is completed, the DCAS host 160 may download and install the SM client in the SM of the DCAS host 160. The DPS 113 may report to the CAS server 140 an access authority of the authenticated DCAS host 160 to a program through a billing system 130. In this instance, the CAS server 140 may transmit an Entitlement Management Message (EMM) to the DCAS host 160 through a Cable Modem Termination System (CMTS) 150.

The SM client downloaded and installed in the SM of the DCAS host 160 may extract a code word using the received EMM through a CAS messages processing operation. Also, the SM client may transmit the extracted code word to a Transport Processor (TP). The TP may decode the encrypted and received program using the code word.

Figure 2:
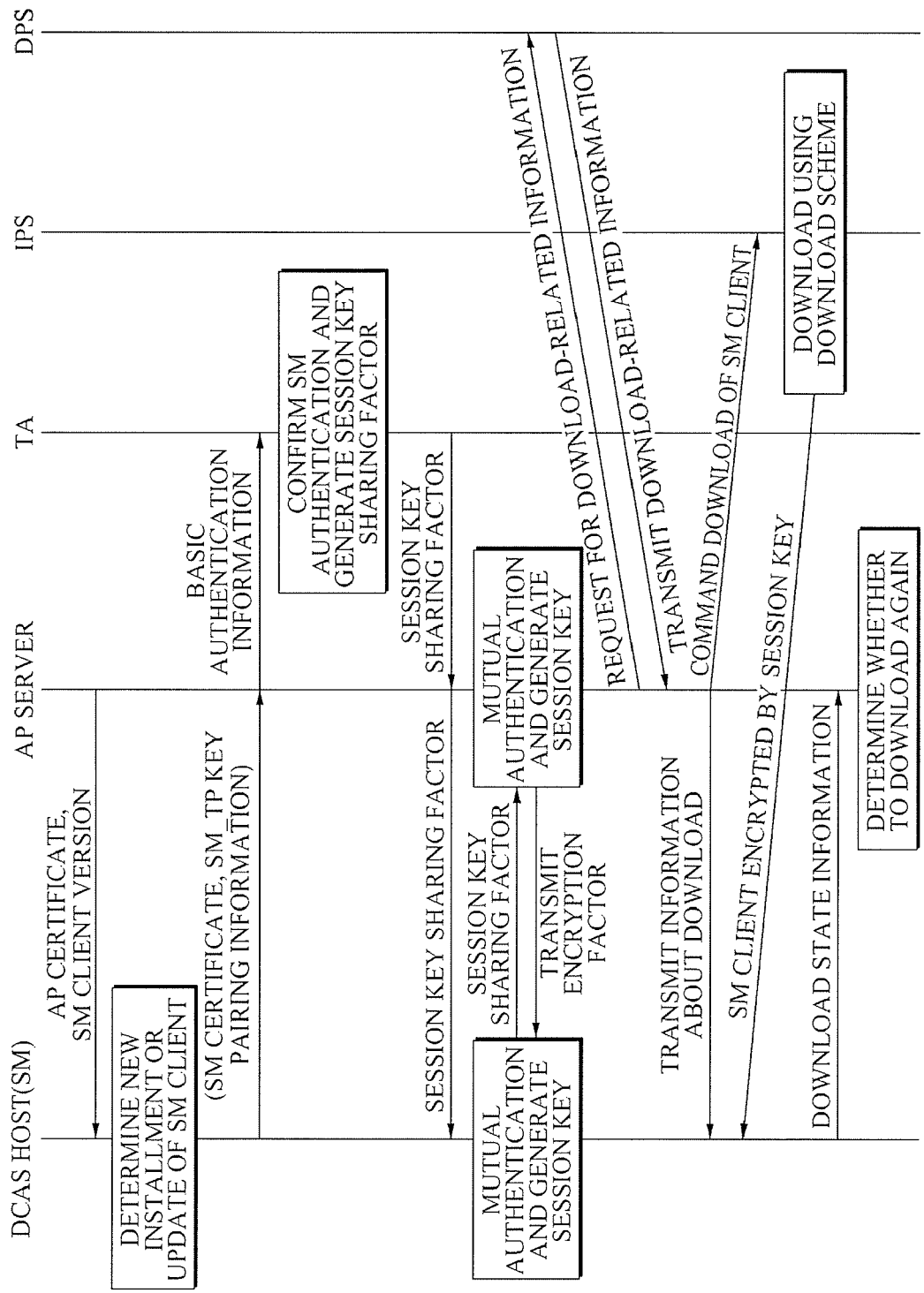
FIG. 2 is a flowchart illustrating operations of entities in a DCAS according to an embodiment of the present invention.

FIG. 2 is a flowchart illustrating operations of entities in a DCAS according to an embodiment of the present invention.

Referring to FIG. 2, an AP server may continuously transmit a certificate of the AP server and SM client version information to a DCAS host via a DCAS network protocol interface. The certificate of the AP server and SM client version information, currently operated, may be used to determine whether downloading of an SM client is necessary.

The certificate of the AP server may be used to authenticate a message received from the AP server by the DCAS host, and to confirm an identity of the AP server.

The DCAS host connected to a DCAS network may determine whether to newly install or update the SM client using the received SM client version information. When the SM client is determined to be newly installed or updated, the DCAS host may transmit basic authentication information to the AP server.

The basic authentication information may include information associated with a key pairing of a TP and an SM, a certificate of the SM, and the like. The certificate of the SM may be used when the AP server authenticates a message received from the DCAS host and confirms an identity of the DCAS host.

The AP server may transmit the basic authentication information to the TA, and the TA may authenticate the SM. When the authentication of the SM is completed, the AP server may generate a session key sharing factor, and transmit the generated session key sharing factor to the AP server.

The AP server may share the session key sharing factor with the DCAS host. The AP server and the DCAS host sharing the session key sharing factor may perform a mutual authentication. When the authentication is completed, each session key may be generated. The session key may be used to encrypt or decrypt a DCAS message and SM client.

The AP server may request a DPS for download-related information or download policy-related information. The download-related information or the download policy-related information may include information associated with a connection (mapping) between an IPS server and the DCAS host, information associated with an address of the IPS server, and information associated with a download scheme or a name of the SM client. The AP server may transmit the download-related information or the download policy-related information to the DCAS host.

The AP server may command the IPS server to perform a process to download the SM client according to a download scheme. The IPS server may perform the process to download the SM client according to the selected download scheme. In this instance, the downloaded SM client may be encrypted using a session key.

The DCAS host may transmit download state information to the AP server in association with whether the SM client is normally downloaded. The AP server may determine whether the SM client is to be downloaded again based on the received download state information. When it is determined that the SM client is to be downloaded again, the AP server may perform a process to download the SM client again.

Figure 3:
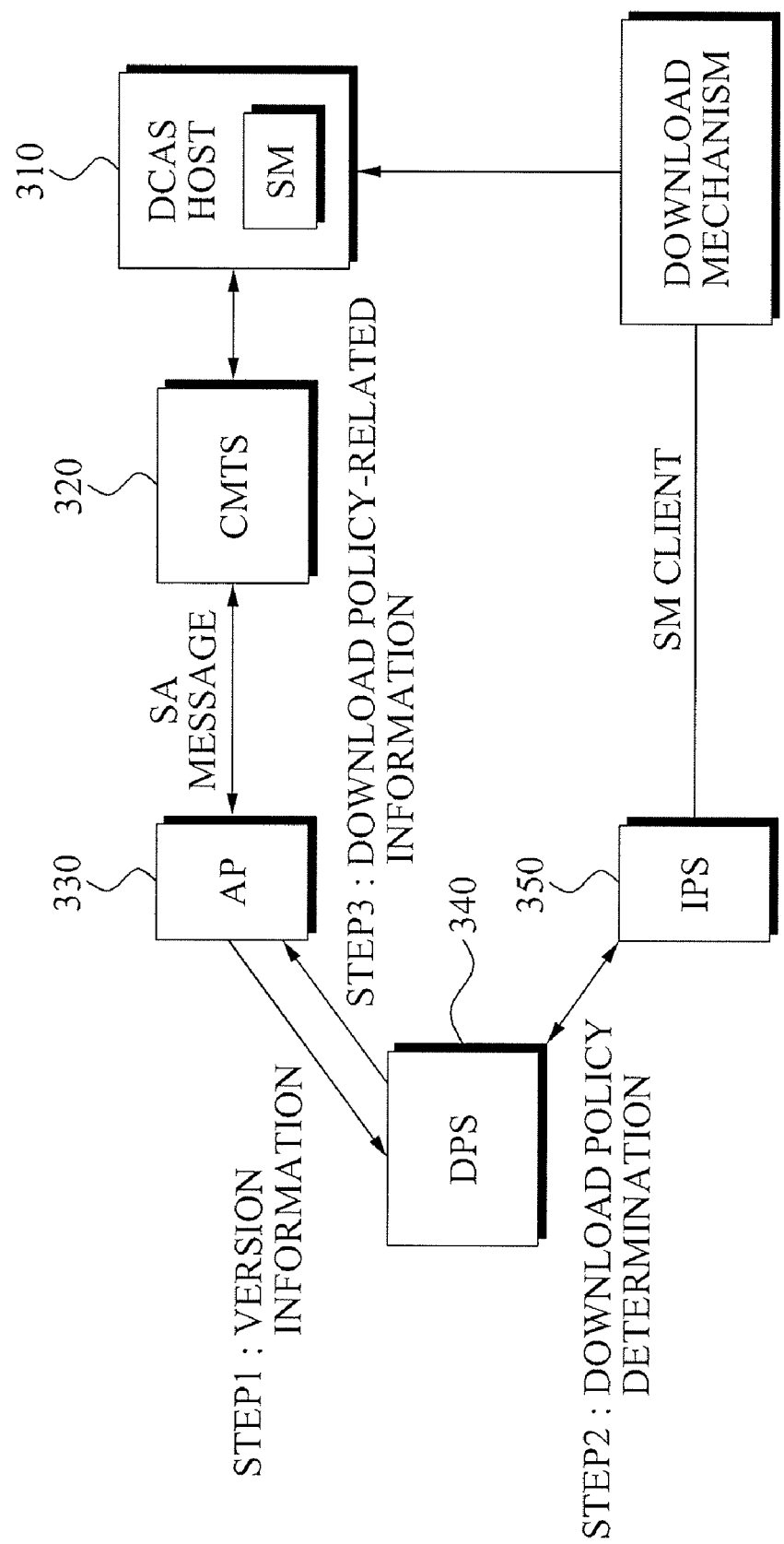
FIG. 3 is a diagram illustrating operations of entities to control a download load generated in a DCAS according to an embodiment of the present invention.

FIG. 3 is a diagram illustrating operations of entities to control a download load generated in a DCAS according to an embodiment of the present invention.

Referring to FIG. 3, in step 1, an AP server 330 may provide a DPS 340 with version information of an SM installed in a DCAS host 310 and version information of an SM client. The version information of the SM may include at least one of hardware version information (HW_Ver) of the SM, software version information (SW_Ver) of the SM, authentication status information (Auth_Status) of the DCAS host 310, and authentication time information (Auth_Time) of the DCAS host 310.

The DPS 340 may ascertain and analyze the version information of the SM and the version information of the SM client with respect to each of connected AP servers which are not clearly illustrated in FIG. 3.

That is, the DPS 340 may ascertain a number of SMs operated by each of the AP servers, a number of SM clients requiring to be updated, a number of SMs connected to each of the AP servers, and the like. The number of SM clients requiring to be update may be ascertained based on the hardware version information (HW_Ver) of the SM and the software version information (SW_Ver) of the SM.

The SMs connected to each of the AP servers may include all SMs whose power is on/off. The SMs operated by each of the AP servers may indicate SMs, actually operated by the AP servers, from among the SMs connected to the AP servers.

In step 2, the DPS 340 may determine a download policy associated with download times of the SM clients for the SMs, based on a result of the analysis of the version information of the SMs and the version information of the SM clients. That is, the DPS 340 may efficiently control a download load, generated in a DCAS network, by appropriately distributing the download times of the SM clients, which will be described in detail below.

In step 3, the DPS 340 may provide the AP server 330 with information associated with the determined download policy. The AP server 330 may determine a transmission time of a Security Announce (SA) message based on information associated with the download policy. Here, the SA message may include version information of a latest SM client, and the version information of the latest SM client may correspond to the hardware version information (HW_Ver) and the software version information (SW_Ver) of the SM. Also, the generated SA message may be transmitted to a DCAS host 310 through a CMTS 320.

The DCAS host 310 may determine whether a currently installed SM client is the latest SM client using the version information of the latest SM client. When the currently installed SM client is not the latest SM client, the DCAS host 310 may download the latest SM client through an IPS 350 according to a predetermined download mechanism.

FIG. 4 is a diagram illustrating various factors used to control a download load according to an embodiment of the present invention.

AP_ID may indicate an identifier (ID) of an AP server. A plurality of AP servers may be connected to a DPS, and each of the plurality of AP servers may be differentiated by its ID.

SM_ID may indicate an ID of an SM. A plurality of SMs or a plurality of DCAS hosts may be connected to an AP server. Each of the plurality of SMs may be differentiated by its ID.

HW_Ver may indicate hardware version information of an SM, and SW_Ver may indicate software version information of an SM. Client_Image_Ver may indicate version information of SM clients installed in an SM, and Auth_Status may indicate authentication status information of an SM.

A number of SM clients, requiring to be update based on the hardware version information (HW_Ver) and the software version information (SW_Ver) of the SM, may be ascertained based on the AP_ID, SM_ID, HW_Ver, SW_Ver, Client_Image_Ver, and Auth_Status.

The DPS may analyze various information such as the AP_ID, SM_ID, HW_Ver, SW_Ver, Client_Image_Ver, and Auth_Status, and determine download times of SM clients to enable a download load of the SM clients to be controlled.

Figure 5:
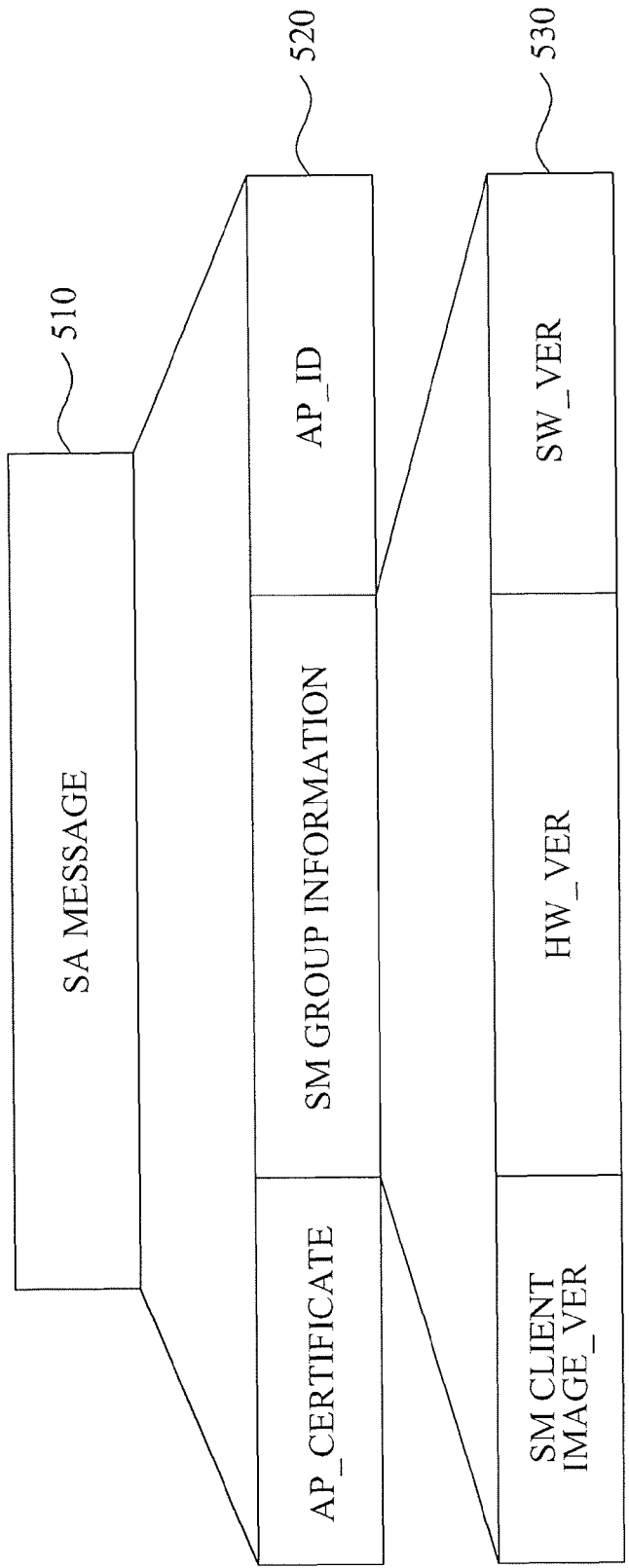
FIG. 5 is a diagram illustrating a Security Announce (SA) message according to an embodiment of the present invention.

FIG. 5 is a diagram illustrating an SA message according to an embodiment of the present invention.

The SA message 510 illustrated in FIG. 5 may be generated by an AP server. Referring to a configuration 520 of FIG. 5, the SA message 510 may include a certificate of the AP server (AP_certificate), SM group information, and ID information of the AP server (AP_ID).

Referring to a configuration 530 of FIG. 5, the SM group information may include hardware version information (HW_Ver) and software version information (SW_Ver) of an SM, and version information (SM Client Image_Ver) of a latest SM client. The version information (SM Client Image_Ver) of the latest SM client may correspond to the hardware version information (HW_Ver) and the software version information (SW_Ver) of the SM.

That is, the SA message 510 may be sorted by the hardware version information (HW_Ver) and the software version information (SW_Ver) of the SM, since the version information (SM Client Image_Ver) of the latest SM client may vary depending on the hardware version information (HW_Ver) and the software version information (SW_Ver) of the SM.

The AP server may determine transmission times of the SA message 510, sorted by the hardware version information (HW_Ver) and the software version information (SW_Ver) of the SM, based on a download policy determined by a DPS.

For example, as a number of SMs requiring download of a particular SM client increases, the DPS may determine the download policy to enable a transmission interval of an SA message corresponding to the particular SA message to be reduced. Also, the AP server may transmit the SA message according to the transmission interval corresponding to the determined download policy.

Accordingly, the AP server may generate various types of SA messages, for example, a type 1, a type 2, a type 3, and the like, depending on the hardware version information (HW_Ver) and the software version information (SW_Ver) of the SM. Also, the AP server may transmit the generated SA messages to SMs at various transmission intervals.

That is, the DPS may determine a download policy associated with a download time to enable download times of SM clients to be appropriately distributed. The AP server may efficiently control a download load generated in a DCAS network using the SA message associated with the download policy.

Figure 6:
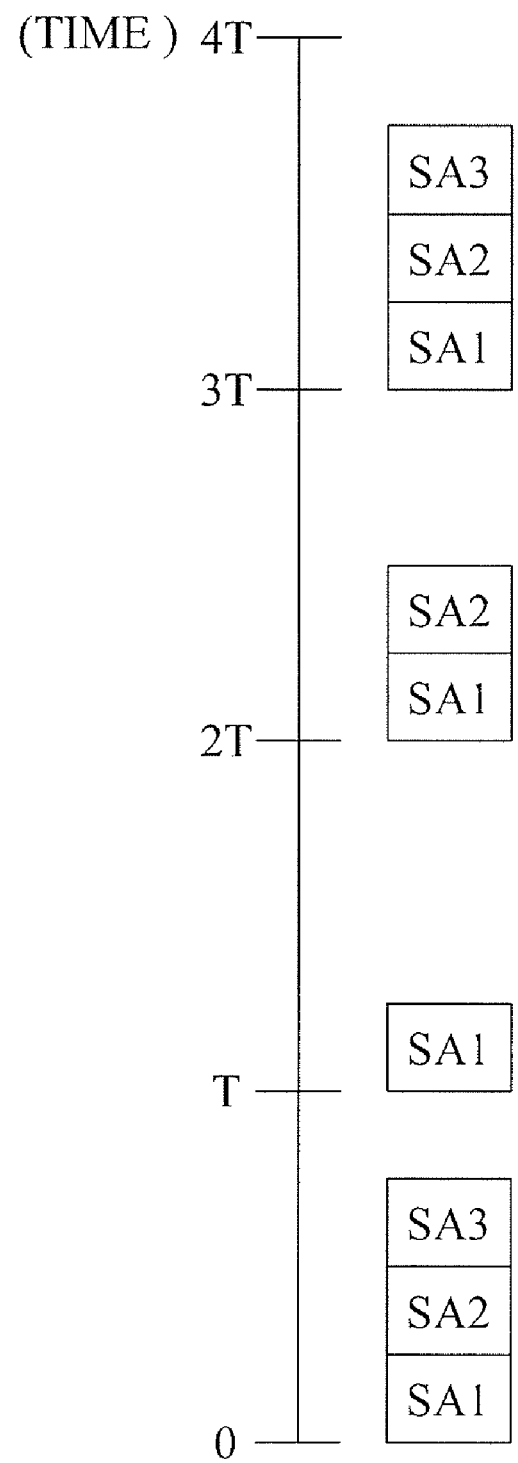
FIG. 6 is a diagram illustrating SA messages having various transmission intervals according to an embodiment of the present invention.

FIG. 6 is a diagram illustrating SA messages having various transmission intervals according to an embodiment of the present invention.

Referring to FIG. 6, the SA messages may be sorted into an SA1, an SA2, and an SA3. That is, a transmission interval of the SA1 may be a T, a transmission interval of the SA2 may be 2T, and a transmission interval of the SA3 may be 3T.

That is, a DPS may determine transmission intervals of SA messages based on a number of SMs requiring download of a particular SM client to enable a download load, generated in a DCAS network, to be appropriately distributed.

For example, since the transmission interval of the SA1, that is, T, the shortest interval, a number of SMs requiring download of an SM client corresponding to the SA1 may be greatest among a number of SMs requiring download of an SM client corresponding to the SA1, the SA2, and the SA3. Conversely, since the transmission interval of the SA3, that is, 3T, the longest interval, the number of SMs requiring download of the SM client corresponding to the SA3 may be smallest.

Figure 7:
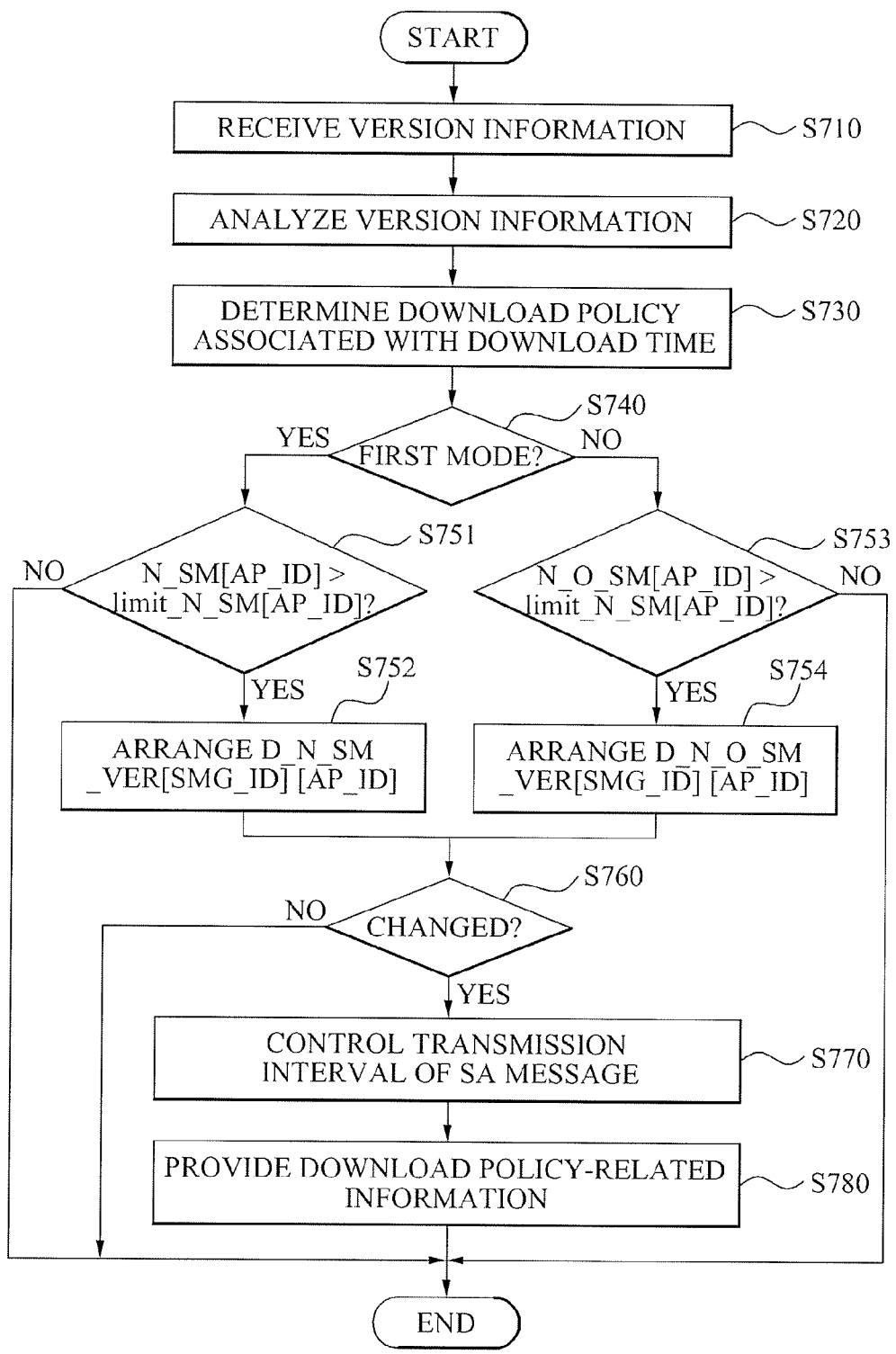
FIG. 7 is a flowchart illustrating a download policy determination method according to an embodiment of the present invention.

FIG. 7 is a flowchart illustrating a download policy determination method according to an embodiment of the present invention.

Symbols below are defined prior to the description with reference to FIG. 7.

N_SM[AP_ID]: A number of SMs operated by an AP server. A DPS may manage a plurality of AP servers. Accordingly, a download load generated in each AP network may be predicted by ascertaining the number of SMs operated by each of the plurality of AP servers. The DPS may compare the N_SM[AP_ID] with a maximum reference value (limit_N_SM[AP_ID]). The limit_N_SM[AP_ID] may indicate the maximum reference value simultaneously processed by each of the plurality of AP servers. When the N_SM[AP_ID] is greater than the limit_N_SM[AP_ID], the DPS may set a corresponding AP server as a target for download load control.

D_N_SM_VER[SMG_ID][AP_ID]: A number of SM clients requiring to be update of hardware version information and software version information of SMs. The DPS may ascertain the number of SM clients requiring to be update of the hardware version information and the software version information of the SMs connected to and operated by each of the plurality of AP servers. The D_N_SM_VER[SMG_ID][AP_ID] may be obtained by comparing version information (Client_Image_Ver) of an SM client, downloaded and installed in an SM, with version information of a latest SM client valid for a DCAS network based on AP_ID, HW_Ver, SW_Ver, and Client_Image_Ver.

N_O_SM[AP_ID]: A number of SMs connected to each of the plurality of AP servers. When a number of SMs connected to the AP server, which is the target of the download load control, is greater than the above-described limit_N_SM[AP_ID], the DPS may use the N_O_SM[AP_ID] as a reference value to start the download load control. The N_O_SM[AP_ID] may be ascertained based on AP_ID, SM_ID, Auth_Status, and Auth_Time.

D_N_O_SM_VER[SMG_ID][AP_ID]: A number of SM clients connected to each of the plurality of AP servers, and requiring to be update for each hardware version information and software version information of the SMs. The D_N_O_SM_VER[SMG_ID][AP_ID] may be used as information to control a download load in real time with respect to the AP server which is the target of the download load control. The D_N_O_SM_VER [SMG_ID][AP_ID] may be ascertained based on AP_ID, HW_Ver, SW_Ver, Auth_Status, Auth_Time, and the like.

Referring to FIG. 7, in the download policy determination method in the DCAS, the DPS may receive version information of SMs and version information of SM clients in operation S710. The version information of the SMs and the version information of the SM clients may be provided from each of the plurality of AP servers, and the SM clients may be installed in the SMs. Here, the version information of the SMs may include ID information (SM_ID) of each of the SMs, hardware version information (HW_Ver) and software version information (SW_Ver) of each of the SMs, and authentication status information (Auth_Status) or authentication time information (Auth_Time) of a DCAS host.

In operation S720, the DPS may analyze the version information of the SMs and the version information of the SM clients installed in the SMs. The DPS may ascertain a number of SM clients requiring to be update based on the version information of the SMs and the version information of the SM clients.

In this instance, the analyzing in operation S720 may include an operation of ascertaining at least one of a number of SMs operated by each of the plurality of AP servers, a number of SMs connected to each of the plurality of AP servers, and a number of SMs requiring download of a target SM client, based on the version information of the SMs and the version information of the SM clients installed in the SMs.

In operation S730, the DPS may determine a download policy associated with a download time of the target SM client for the SMs based on a result of the analysis.

In this instance, the download policy associated with the download time of the target SM client may be determined to control a download load generated in the DCAS based on the result of the analysis in operation S730.

That is, the download policy associated with the download time of the target SM client may be determined to enable download times of the SM clients to be appropriately distributed in operation S730.

Also, in operation S730, the DPS may select any one of a first mode and a second mode. A download policy may be determined with respect to SMs connected to and operated by each of the plurality of AP servers in the first mode, and a download policy may be determined with respect to all SMs connected to the plurality of AP servers in the second mode.

In the second mode, the DPS may perform a monitoring algorithm to determine whether the SMs are connected to and operated by each of the plurality of AP servers.

In operation S740, the DPS may determine whether the selected mode is the first mode.

In operation S751, when the first mode is selected, the DPS may compare the N_SM[AP_ID] with the limit_N_SM[AP_ID]. When the N_SM[AP_ID] is greater than the limit_N_SM[AP_ID], the DPS may arrange D_N_SM_VER[SMG_ID][AP_ID] in a particular order such as a descending order in operation S752.

Conversely, when the second mode is selected, the DPS may compare the N_O_SM[AP_ID] with the limit_N_SM[AP_ID]. When the N_O_SM[AP_ID] is greater than the limit_N_SM[AP_ID], the DPS may arrange D_N_O_SM_VER[SMG_ID][AP_ID] in a particular order in operation S754.

In operation S760, the DPS may determine whether a result of the arrangement in operation S752 or S754 is different from a previous arrangement result.

The result of the arrangement in operation S752 or S754 has changed, which may indicate that a number of SMs, included in at least one group of groups sorted for each hardware version information and software version information, has changed.

In operation S770, the DPS may control or determine a transmission interval of an SA message corresponding to SMs included in the at least one group.

For example, when the number of SMs included in the at least one group increases, the DPS may reduce the transmission interval of the SA message. When the number of SMs included in the at least one group decreases, the DPS may increase the transmission interval of the SA message.

In operation S780, the DPS may provide each of the plurality of AP servers with information associated with the download policy associated with the controlled or determined transmission interval of the SA message.

In this instance, each of the plurality of AP servers may transmit the SA message to the SMs at the determined transmission interval.

The download policy determination and operating method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 8:
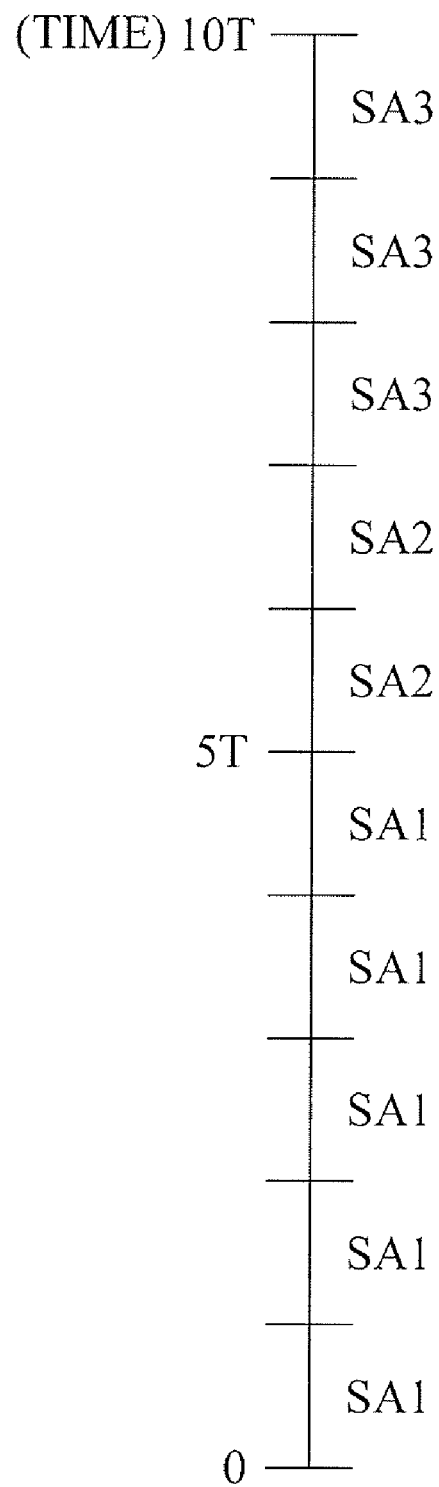
FIG. 8 is a diagram illustrating various transmission times of SA messages according to an embodiment of the present invention.

FIG. 8 is a diagram illustrating various transmission times of SA messages according to an embodiment of the present invention.

Referring to FIG. 8, an SA1, an SA2, and an SA3 may indicate an SA message corresponding to a first group, a second group, and a third group, respectively. The first group, the second group, and the third group may be three groups from among groups sorted for each hardware version information and software version information of SMs.

The SA1 may be transmitted to SMs included in the first group five times during a 5T period. The SA2 may be transmitted to SMs included in the second group two times during 2T period. The SA3 may be transmitted to SMs included in the third group three times during 3T period.

In this instance, when a number of SMs included in the first group increases, a number of transmissions of the SA1 may increase. When a number of SMs included in the second group decreases, a number of transmissions of the SA2 may decrease.

That is, a DPS may increase or decrease the number of transmissions using a number of SMs included in each of the groups or a number of SM clients requiring to be updated.

Figure 9:
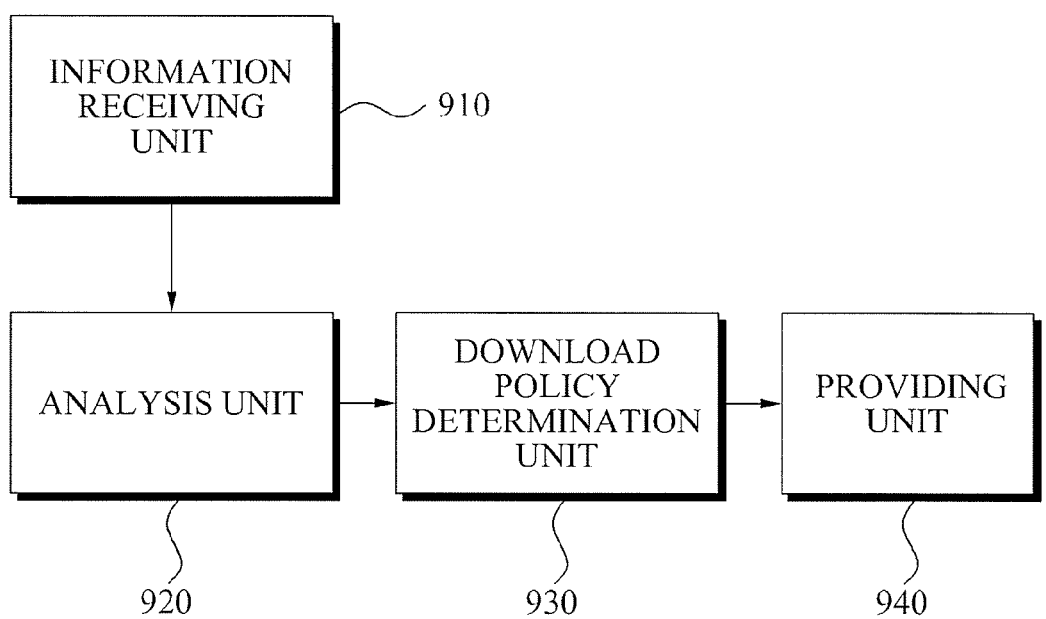
FIG. 9 is a block diagram illustrating a DCAS provisioning server (DPS) according to an embodiment of the present invention.

FIG. 9 is a block diagram illustrating a DPS according to an embodiment of the present invention.

Referring to FIG. 9, the DPS may include an information receiving unit 910, an analysis unit 920, a download policy determination unit 930, and a providing unit 940.

The information receiving unit 910 may receive version information of SMs and version information of SM clients. The version information of the SMs and the version information of the SM clients may be provided from an AP server, and the SM clients may be installed in the SMs.

The analysis unit 920 may analyze the version information of the SMs and the version information of the SM clients. In this instance, the analysis unit 920 may ascertain at least one of a number of SMs operated by the AP server, a number of SMs connected to the AP server, and a number of SMs requiring download of a target SM client, based on the version information of the SMs and the version information of the SM clients installed in the SMs.

The download policy determination unit 930 may determine a download policy, associated with a download time of the target SM client for the SMs, based on a result of the analysis. In this instance, the download policy determination unit 930 may determine the download policy associated with the download time of the target SM client to control a download load generated in a DCAS based on the result of the analysis.

The providing unit 940 may provide the AP server with information associated with the determined download policy.

In this instance, the AP server may transmit an SA message to the SMs based on the information associated with the provided download policy. The SMs may attempt to download the target SM client in response to the SA message.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A download policy determination method in a Downloadable Conditional Access System (DCAS), the download policy determination method comprising:

analyzing version information of Secure Micros (SMs) and version information of SM clients, the version information of the SMs and the version information of the SM clients being provided from an Authentication Proxy (AP) server, the SM clients being installed in the SMs;

determining a download policy based on a result of the analysis, wherein the determined download policy configures a download time of each of at least two or more different target clients for the SMs, wherein the download time of each of the least two or more different target clients for the SMs are proportionally distributed based on a number of SMs requiring downloads of each of the respective different target SM clients, and wherein a transmission interval of a Security Announce (SA) message associated for each of the respective target SM clients is inversely proportionally to the number of SMs requiring downloads of each of the respective target SM clients increases; and providing the AP server with information associated with the determined download policy.

2. The download policy determination method of claim 1, wherein the determining determines the download policy associated with the download time of the target SM client to control a download load generated in the DCAS based on the result of the analysis.

3. The download policy determination method of claim 1, wherein the analyzing comprises:

ascertaining at least one of a number of SMs operated by the AP server, a number of SMs connected to the AP server, and the number of SMs requiring download of each of the two or more different target SM clients, based on the version information of the SMs and the version information of the SM clients installed in the SMs.

4. The download policy determination method of claim 1, wherein the determining determines the download policy associated with the download time based on at least one of a number of SMs operated by the AP server, a number of SMs connected to the AP server, and a number of SMs requiring download of each of the two or more different target SM clients.

5. The download policy determination method of claim 1, wherein the analyzing analyzes information about the SMs and the SM clients based on the version information of the SMs and the version information of the SM clients.

6. The download policy determination method of claim 1, wherein the AP server transmits the SA message to the SMs based on the information associated with the provided download policy.

7. The download policy determination method of claim 6, wherein the SMs attempt to download the target SM client in response to the SA message.

8. The download policy determination method of claim 6, wherein the AP server controls a transmission interval of the SA message based on the information associated with the provided download policy.

9. The download policy determination method of claim 8, wherein the transmission interval of the SA message associate with the respective target SM client decreases as a number of SMs requiring download of the respective target SM client increases.

10. The download policy determination method of claim 1, wherein the determining determines the download policy associated with SMs connected to the AP server, or the download policy associated with SMs operated by the AP server.

11. A download policy operating method in a Downloadable Conditional Access System (DCAS), the download policy operating method comprising:

providing a DCAS provisioning server (DPS) with version information of Secure Micros (SMs) and version information of SM clients, the SM clients being installed in the SMs;

receiving information about a download policy from the DPS, wherein the received information about the download policy configures a download time of each of at least two or more different target clients for the SMs, wherein the download time of each of the least two or more different target clients for the SMs are proportionally distributed based on a number of SMs requiring downloads of each of the respective different target SM clients, and wherein a transmission interval of a Security Announce (SA) message associated for each of the respective target SM clients is inversely proportionally to the number of SMs requiring downloads of each of the respective target SM clients increases; and transmitting the SA message to the SMs based on the received information about the download policy, and wherein a change in the download policy is configured to cause a change in the transmission interval of a Security Announce (SA) message.

12. The download policy operating method of claim 11, wherein the DPS analyzes the version information of the SMs and the version information of the SM clients, and determines the download policy based on a result of the analysis.

13. The download policy operating method of claim 11, wherein the SMs attempt to download each of the at least two or more different target clients in response to the SA message.

14. The download policy operating method of claim 11, wherein the transmitting comprises:

controlling a transmission interval of the SA message based on the information associated with the received download policy.

15. The download policy operating method of claim 14, wherein the transmission interval of the SA message associated with the respective target decreases as a number of SMs requiring download of the respective target SM client increases.

16. A download policy server (DPS) in a Downloadable Conditional Access System (DCAS) provisioning server (DPS), the DPS comprising:

a processor and memory having stored therein instruction codes, which when executed by the processor perform the following steps:

analyzing version information of Secure Micros (SMs) and version information of SM clients, the version information of the SMs and the version information of the SM clients being provided from an Authentication Proxy (AP) server, the SM clients being installed in the SMs;

determining a download policy based on a result of the analysis, wherein the determined download policy configures a download time of each of at least two or more different target clients for the SMs, wherein the download time of each of the least two or more different target clients for the SMs are proportionally distributed based on a number of SMs requiring downloads of each of the respective different target SM clients, and wherein a transmission interval of a Security Announce (SA) message associated for each of the respective target SM clients is inversely proportionally to the number of SMs requiring downloads of each of the respective target SM clients increases; and providing the AP server with information associated with the determined download policy.

17. The DPS of claim 16, the AP server transmits the SA message to the SMs based on the information associated with the provided download policy.

18. The DPS of claim 16, the SMs attempt to download the respective target SM client in response to the SA message associated with the respective target SM client.

19. A download policy determination method in a Downloadable Conditional Access System (DCAS), the download policy determination method comprising:

analyzing version information of Secure Micros (SMs) and version information of SM clients, the version information of the SMs and the version information of the SM clients being provided from an Authentication Proxy (AP) server, the SM clients being installed in the SMs;

determining a download policy based on a result of the analysis, wherein the determined download policy configures a download time of a target client for the SMs, and wherein the download time of each of the target client for the SMs are proportionally distributed based on a number of SMs requiring downloads of the target SM client, and wherein a transmission interval of a Security Announce (SA) message associated for the target SM client is inversely proportionally to the number of SMs requiring downloads of the target SM client increases; and providing the AP server with information associated with the determined download policy.

\* \* \* \* \*